United States Patent [19]
DeMaria et al.

[11] Patent Number: 5,680,412
[45] Date of Patent: Oct. 21, 1997

[54] APPARATUS FOR IMPROVING THE OPTICAL INTENSITY INDUCED DAMAGE LIMIT OF OPTICAL QUALITY CRYSTALS

[75] Inventors: Anthony J. DeMaria, West Hartford, Conn.; John T. Kennedy, Palm City; Richard A. Hart, Stuart, both of Fla.

[73] Assignee: Demaria Electrooptics Systems, Inc., Bloomfield, Conn.

[21] Appl. No.: 506,782

[22] Filed: Jul. 26, 1995

[51] Int. Cl.$^6$ ................................................ H01S 3/08
[52] U.S. Cl. .................... 372/92; 372/21; 372/39; 372/97; 372/34; 372/103; 372/107; 372/108
[58] Field of Search .......................... 372/21, 22, 43, 372/93, 94, 103, 92, 34, 107, 97, 39, 108; 359/588

[56] References Cited

U.S. PATENT DOCUMENTS

| | | | |
|---|---|---|---|
| 4,205,329 | 5/1980 | Dingle | 372/5 |
| 4,536,063 | 8/1985 | Southwell | 359/588 |
| 5,063,566 | 11/1991 | Dixon | 372/22 |
| 5,070,505 | 12/1991 | Dixon | 372/22 |
| 5,321,718 | 6/1994 | Waarts et al. | 372/99 |
| 5,351,255 | 9/1994 | Schetzina | 372/45 |
| 5,459,604 | 10/1995 | Corkum et al. | 372/75 |

OTHER PUBLICATIONS

Bhar et al; "A proposed tunable coherent 10 m source in noncritically phase matched CdSe and AgGaSe/"; J. Phus, D. Appl Phys., 14 (1981) 1757–60. No month.

*Primary Examiner*—Leon Scott, Jr.
*Attorney, Agent, or Firm*—Fishman, Dionne, Cantor & Colburn

[57] ABSTRACT

The apparatus of the present invention significantly improves the optical intensity induced damage limit of optical quality crystals, and in particular crystals used in the conversion of laser radiation at a specific wavelength to another wavelength or other wavelengths through non-linear interaction of the input laser radiation with the optical crystal medium. In accordance with the present invention, passive optical elements are positioned at the laser beam exiting and entrance surfaces of the active optical element. The surfaces of the passive optical elements are placed up against respective exiting and entrance surfaces of the active optical element. Since the optically transparent passive optical elements have higher mass than optical coatings, they provide vastly superior cooling, and therefore, considerably higher laser damage threshold for the surfaces. Higher damage thresholds results in a significant increase in the performance, reliability, and failure damage safety margin while reducing size and cost of high intensity laser systems and subsystems that utilize active optical elements.

59 Claims, 3 Drawing Sheets

APPARATUS FOR IMPROVING THE OPTICAL INTENSITY INDUCED DAMAGE LIMIT OF OPTICAL QUALITY CRYSTALS

BACKGROUND OF THE INVENTION

The present invention relates generally to lasers. More specifically, the present invention relates to an apparatus for improving the optical intensity induced damage limit of optical quality crystals used in or with lasers and laser systems.

It is well known in laser technology, that the conversion efficiency of the non-linear interaction of input laser radiation with an optical crystal medium increases as the intensity or power per unit area of the input optical laser pump beam increases. To maximize non-linear conversion efficiency and converted output power, it is desirable to increase the input pump power density to the crystal by increasing the total pump power and/or focusing the pump beam. In practice, the maximum output power obtainable with a given crystal material is limited by the average-power thermal damage limit of the crystal material or of the end-face thin-film coatings. For many active optical crystal mediums, the optical damage threshold thereof is lower than that of the passive optical mediums.

SUMMARY OF THE INVENTION

The apparatus of the present invention significantly improves the optical intensity induced damage limit of optical quality crystals, and in particular crystals used in the conversion of laser radiation at a specific wavelength to another wavelength or other wavelengths through non-linear interaction of the input laser radiation with the optical crystal medium. The increase of the surface damage limit of non-linear crystals leads to beneficial improvements in their conversion efficiency and total converted average power capability.

More specifically, the laser through-put optical damage threshold of active optical elements is increased. These optical elements having exiting and/or entrance surfaces which are damaged by increased thermal heating arising at these surfaces because of the lower thermal conductivity of the atmospheric environment in contact with these surfaces. The bulk of the active optical element can be effectively cooled by placing the material in contact with a cooling plate. Many passive optical materials have higher surface damage thresholds than that of active optical crystal materials. In the prior art, increasing the damage threshold of optical elements, more specifically the laser beam exiting and entrance surfaces of such active optical elements, was performed by depositing optical coatings of passive optical materials on these surfaces which have a higher laser damage threshold than the bulk material. This prior art technique has a limited beneficial effect because of the thinness of the thin film which yield a very limited conduction cooling capacity.

In accordance with the present invention, transparent passive optical elements whose surfaces have higher optical damage thresholds than that of the active optical element are positioned at the laser beam exiting and entrance surfaces of the active optical element. The surfaces of the passive optical elements are placed up against respective exiting and entrance surfaces of the active optical element. Preferably, these surfaces are optically polished to assure good optical and thermal contact. Since the optically transparent passive optical elements have higher mass than optical coatings, they provide vastly superior cooling, and therefore, considerably higher laser damage threshold for the surfaces.

Higher damage thresholds results in a significant increase in the performance, reliability, and failure damage safety margin while reducing size and cost of high intensity laser systems and subsystems that utilize active optical elements for applications, such as non-linear optical harmonic generation; optical parametric amplification and oscillation; non-linear optical scattering for the generation of other optical wavelengths utilizing Raman or Brillouin scattering; acousto-optics or electro-optics elements for modulating, Q-switching, frequency translating, or scanning of laser beams. The present invention will also improve the surface damage threshold of high power lasers such as: semiconductor lasers, solid state lasers, and fiber lasers and amplifiers as well as electro-optical modulators whose laser beam exiting and entrance surfaces also are prone to optical damage because of poor cooling of these surfaces in contact with the atmospheric environment.

Active optical CdTe crystals are extensively utilized as electro-optics modulators for $CO_2$ lasers. It is generally difficult to get anti-reflection coatings to stick well to the laser beam entrance and exiting surfaces of CdTe modulators. Peeling of these coatings is a common damage failure for these modulators. This problem does not exist with a passive optical window material such as ZnSe or GaAs. Since CdTe and ZnSe have refractive indexes which are close (i.e., n=2.7 and 2.4, respectively) at $CO_2$ laser wavelengths, the present, invention is also well suited for reducing optical damage to anti-reflection coatings on CdTe active crystals for $CO_2$ laser modulation applications.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several Figures.

DESCRIPTION OF THE PREFERRED EMBODIMENT

Figure 1:
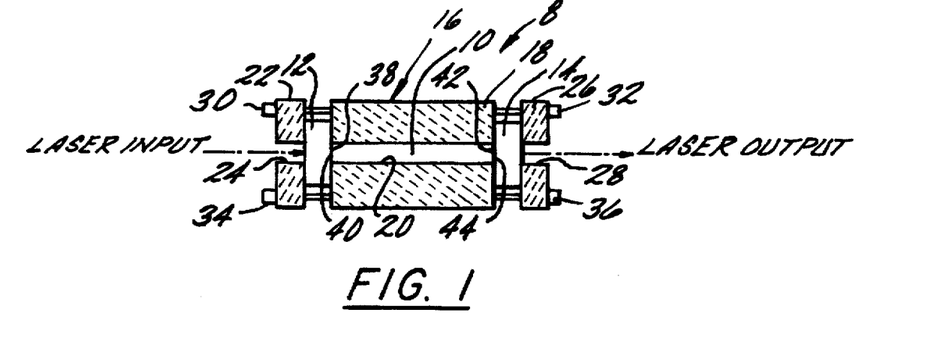
FIG. 1 is diagrammatic side cross sectional view of an optical device in accordance with the present invention.

Referring to FIG. 1, an optical assembly 8 comprising a non-linear $AgGaSe_2$ crystal 10 disposed between two anti-reflection coated GaAs (another suitable material includes ZnSe) windows 12 and 14 is generally shown. A crystal mount housing 16 comprises support member 18 having an opening 20 therethrough with crystal 10 disposed therein, an end support member 22 having an opening 24 therethrough for supporting window 12, and an end support member 26 having an opening 28 therethrough for supporting window 14. End members 22 and 26 are secured to member 18 by fasteners 30, 32, 34 and 36. Mount housing 16 supports the windows 12, 14 and the non-linear crystal 10 with the optically flat surfaces thereof in uniform contact with each other (i.e., surface 38 of window 12 is in contact with surface 40 of crystal 10 and surface 42 of window 14 is in contact with surface 44 of crystal 10). Anti-reflective coatings on one of these interfacing surfaces are generally not required for $AgGaSe_2$ and ZnSe because the index of refraction ZnSe is similar to that of $AgGaSe_2$ (see TABLE 1 below), whereby the Fresnel reflection at their interfaces is very low, e.g., on the order of 1% or less. Anti-reflection coatings may be required when the Fresnel reflection is too large or when material is utilized whose refraction index are not close, such as between $AgGaSe_2$ (n=2.6) and GaAs (n=3.3) (see Table I below). The surfaces of windows 12 and 14 not in contact with crystal 10 are anti-reflection coated, as is well known, whereby the total transmission of the three optical elements (i.e., windows 12, 14 and crystal 10) is very high, e.g., on the order of 98% or more. In accordance with the present invention, the aforementioned surface heating problem is transferred from the surface of the crystal 10 to the surfaces of the windows 12 and 14. Heat deposited near the surface of the non-linear crystal 10 flows into the window material as well as into the non-linear crystal. Referring to TABLE 1 below thermal properties, indexes of refraction, and the Fresnel reflectivities at the interfaces of the above reference materials are shown. These materials are suitable for the infrared region.

TABLE 1

| Material | Thermal Conductivity (W/cm-°C.) | Specific heat (J/cm³ -°C.) | $\lambda = 10$ μm Refractive Index | Fresnel Reflection |
|---|---|---|---|---|
| $AgGaSe_2$ | 0.010 | 1.8 | 2.6 | — |
| GaAs | 0.48 | 1.7 | 3.3 | 0.014 |
| ZnSe | 0.18 | — | 2.4 | 0.002 |
| CdTe | — | — | 2.7 | — |

The reflectivity loss at the interface for ZnSe window material, in the above examples, is sufficiently low, consequently requiring only optical-quality surface contact between the two materials, with no anti-reflection coating at the interface for most applications. Since the thermal conductivity of the window material is over an order of magnitude greater than the non-linear optic material, heat rise at the critical non-linear crystal surface is significantly lowered for a given pump power, thereby increasing the damage threshold. In addition, the surface higher optical damage threshold of the ZnSe (or GaAs) optical windows enable the laser beam intensity to be increased in the system.

The window material is selected to optimize the thermal diffusivity at the window/non-linear crystal interface. For the example discussed above, the thermal diffusivity of GaAs is forty-eight times that of $AgGaSe_2$. Thus, not only will axial thermal diffusion be much more effective, but lateral diffusion will be beneficial even for relatively large spot sizes.

Surface damage related to the anti-reflection coating that may be caused by non-fundamental issue such as dust contamination may occur in the window material which in most circumstances can be replaced inexpensively compared to the non-linear crystal.

The foregoing is supported by the following experimental results. More, specifically, the output from a high pulse-repetition-frequency, Q-switched-cavity-dumped $CO_2$ laser was focused into the center of a 4 cm long piece of $AgGaSe_2$ that was anti-reflection coated and phased matched for second harmonic generation. The transmission of the anti-reflection coated crystal was ~96% due to a combination of Fresnel reflections and crystal absorption. The average power of the laser was increased in one watt increments until damage of the input anti-reflection surface occurred at an intensity of approximately 20 kW/cm³. The maximum average second harmonic generation output power obtained with this prior art configuration was limited to under 2.0 W. Using two cm long anti-reflection coated ZnSe windows and an identical 4 cm long $AgGaSe_2$ crystal in the configuration shown in FIG. 1, enabled reliable operation at an average pump power density of 30 kW/cm³ limited only by the average power capability of the $CO_2$ laser available for these experiments. The close matching of the refractive index of these crystals results in a Fresnel reflection at the interface where the crystals are in contact (i.e., the passive optical ZnSe crystal and the active optical $AgGaSe_2$ crystal) of approximately 0.2%. The transmission of this configuration was also ~96%, indicating that the window/crystal interface resulted in no additional losses. The corresponding increase in the second harmonic generation conversion process resulted in a second harmonic generation average power of over 3 watts, the highest second harmonic generation average power heretofore achieved using a high pulse repetition frequency Q-switched cavity dumped $CO_2$ laser and $AgGaSe_2$ as the non-linear crystal.

While the above experimental results employ a particular set of windows and non-linear material to solve a damage problem associated with the conversion of 9.2 micron–10.6 micron $CO_2$ radiation to the 4.6 micron–5.8 micron mid infrared band using the non-linear process of second harmonic generation, it will be appreciated that the present invention is equally applicable to other non-linear crystals, non-linear processes and wavelength regions, including, but not be limited to, optical parametric oscillators, sum mixing generation, frequency difference generation, second harmonic generation, third harmonic generation, fourth harmonic generation at wavelengths that encompass the far-infrared, mid-infrared, near-infrared, visible and ultraviolet spectral regions.

Further, the invention may be utilized to increase the surface damage threshold of acousto-optics and electro-optics elements for modulating, Q-switching, frequency translating or scanning of laser beams.

When the index of refraction of the optical window material is not closely matched to that of the crystal material, the resulting Fresnel reflection at the optical interfaces will be high. One of the surfaces (i.e., an optical window surface or a crystal surface) at each of the optical interfaces can be coated with a thin film, thereby forming an anti-reflection coating thereon which improves the Fresnel reflection at the optical interfaces (i.e., a low Fresnel reflection).

Figure 2:
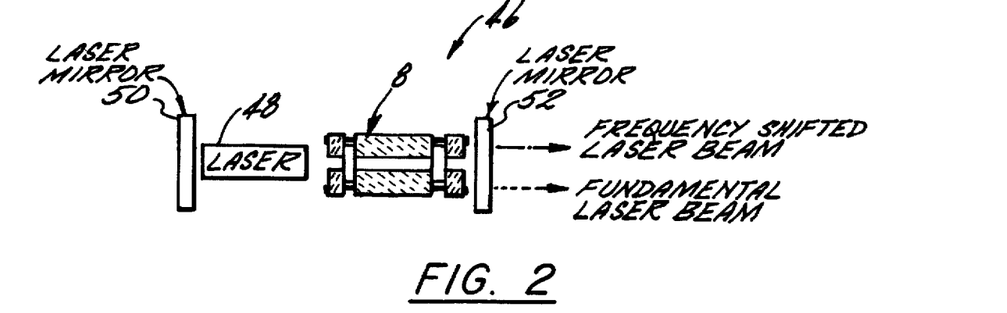
FIG. 2 is a diagrammatic view of the optic device of FIG. 1 employed in a laser system.

Referring to FIG. 2, a laser system 46 comprising a laser source 48 and corresponding laser mirrors 50 and 52 is shown, as is well known. In accordance with the present invention, optical assembly 8 is inserted into laser system 46 between laser source 48 and the laser mirror 52 at the system output, thereby generating a fundamental laser beam output and a frequency shifted laser beam output. Further, for such non-linear optical effects, i.e., frequency shifting by second harmonic generation, the conversion efficiency grows exponentially with increasing optical intensifies.

Figure 3:
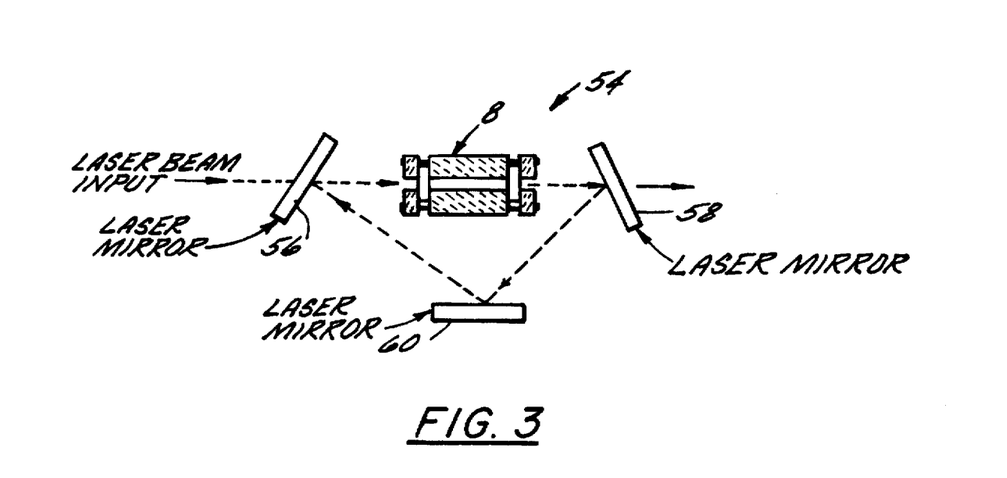
FIG. 3 is a diagrammatic view of the optic device of FIG. 1 employed in a resonant ring optical cavity external to a laser.

Referring to FIG. 3, a resonant ring optical cavity configuration for use external to a laser is shown generally at 54, as is well known. Resonant ring optical cavity 54 comprises an input laser mirror 56, which allows the laser input beam to pass through, and an output laser mirror 58, which reflects the laser beam until it is coupled out. This reflected laser beam is directed at a third laser mirror 60 which reflects the beam back to input laser mirror 56 where the beam is reflected back towards output laser mirror 58 and is combined with the input laser beam, thereby completing the ring, again as is well known. Accordingly, the laser beam is trapped in the ring resonator and builds up optical flux. In accordance with the present invention, optical assembly 8 is inserted between input laser mirror 56 and output laser mirror 58 within the resonant ring optical cavity, resulting in frequency shifted laser beam being coupled out of the ring resonator. Again, the conversion efficiency grows exponentially with increasing optical intensities.

Figure 4:
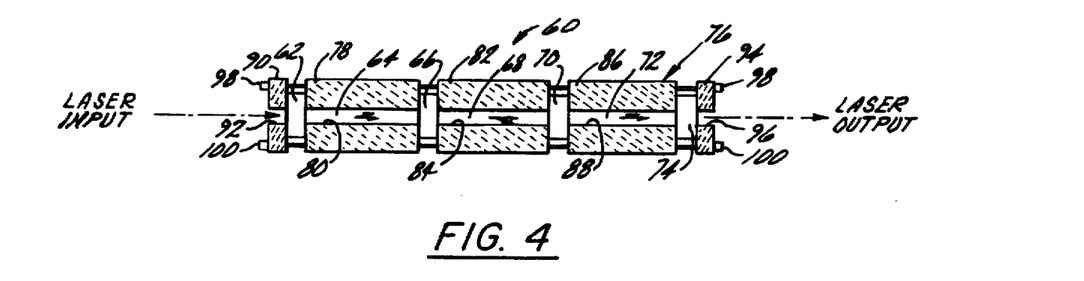
FIG. 4 is a diagrammatic side cross sectional view of an optical device having multiple optic assemblies in accordance with the present invention.

Referring to FIG. 4, in accordance with an alternate embodiment, an optical assembly 60 comprised of multiple optical elements is generally shown. Assembly 60 comprises a first ZnSe (or GaAs) window 62 with its laser entering surface anti-reflection coated, adjacent a first non-linear $AgGaSe_2$ crystal 64, adjacent a second ZnSe (or GaAs) window 66, adjacent a second non-linear $AgGaSe_2$ crystal 68, adjacent a third ZnSe (or GaAs) window 70, adjacent a third non-linear $AgGaSe_2$ crystal 72, adjacent a fourth ZnSe (or GaAs) window 74 with its laser exiting surface anti-reflection coated. A crystal mount housing 76 comprises a support member 78 having an opening 80 therethrough with crystal 64 disposed therein, a support member 82 having an opening 84 therethrough with crystal 68 disposed therein and with window 66 disposed between members 78 and 82, a support member 86 having an opening 88 therethrough with crystal 72 disposed therein and with window 70 disposed between members 82 and 86, end support member 90 having an opening 92 therethrough for supporting window 62, and an end support member 94 having an opening 96 therethrough for supporting window 74. These members are secured together by fasteners 98 and 100. It will be appreciated that the number of fasteners is dictated by the shape of the support and end members. The interfacing surfaces of the windows and the crystals are uncoated optically flat surfaces and are in uniform contact with each other adjacent surface, as described above with regard to the embodiment of FIG. 1.

Optical assembly 60 provides for rotating the c-axis of adjacent crystals by 180° about the beam axis relative to each other, as illustrated by the arrows in FIG. 4, thereby reversing the beam walk-off direction in each crystal which prevents the second harmonic beam from walking away from the pump beam as it passes through assembly 60. Accordingly, longer second harmonic conversion lengths can be utilized, than were previously practical with prior art technology, whereby optimum conversion from the fundamental laser beam to the frequency converted beam can be obtained.

Figure 5:
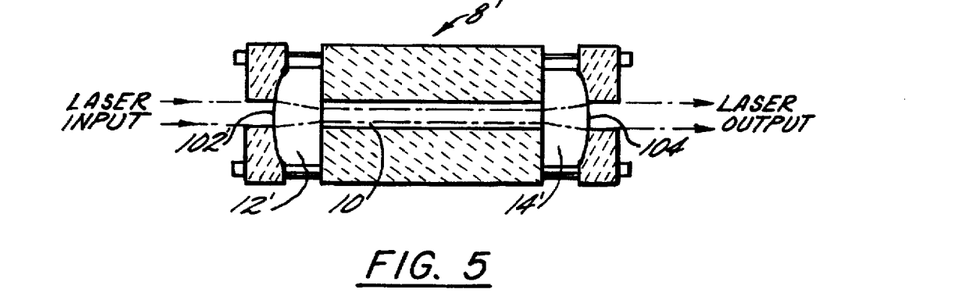
FIG. 5 is a diagrammatic side cross sectional view of an alternate embodiment of the optical device of FIG. 1.

Referring to FIG. 5, an alternate embodiment of optical assembly 8 is shown generally at 8', with the exception of the windows the assemblies are the same and reference is made thereto for a detailed description thereof. More specifically, window 12' differs from window 12 in that the entrance or input surface 102 is convex, and window 14' differs from window 14 in that the exit or output surface 104 is convex. This configuration results in the laser input beam being focused through the assembly so as to obtain higher optical flux for obtaining higher conversion efficiency. It will be appreciated that these surfaces can be optically polished to other profiles suitable for converging, diverging, collimating or otherwise directing the laser beam through the assembly as required by specific applications. Further, to optimize conversion efficiency, the window material thickness can be adjusted to permit larger spot sizes at the window's anti-reflection surface thereby minimizing the possibility of optical damage at this interface.

Figure 6:
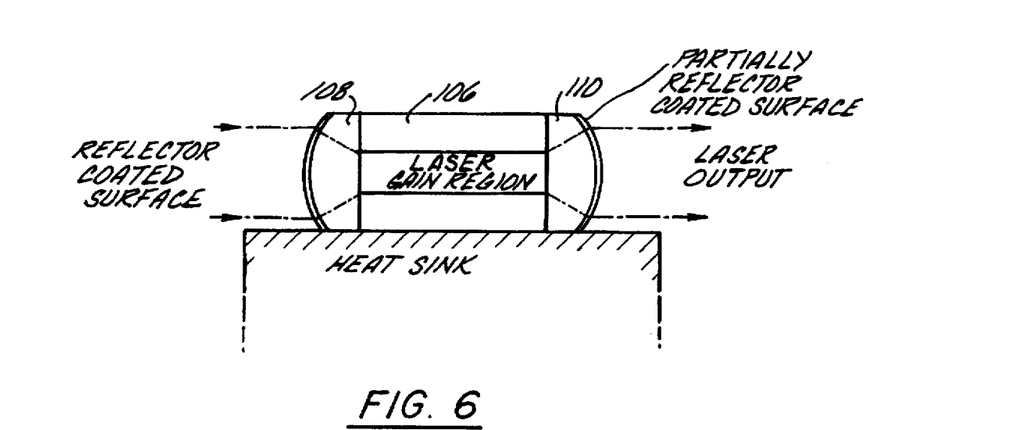
FIG. 6 is a diagrammatic side cross sectional view of a semiconductor laser employing passive cooling optical windows in accordance with the present invention.

Referring to FIG. 6, a semiconductor laser 106 (or other type of solid state lasers medium) is disposed between two passive cooling optical windows 108 and 110, of the type discussed hereinabove, however these windows are preferably comprised of GaAlAs or GaAs. The window surfaces may be curved (e.g., convex), as described hereinbefore, to collimate the laser beam, whereby the beam is concentrated in the gain region of the semiconductor laser. The interfacing surfaces of laser 106 and windows 108 and 110 are uncoated optically flat surfaces which are in uniform contact with each other. These surfaces of the semiconductor laser are also known to suffer optical damage and limit the average power output that can be extracted from such lasers because of poor heat conductivity, whereby the prior art has optical coatings on these surfaces to prevent damage at the desired optical intensity. The exterior surface of window 108 is reflector coated and the exterior surface of window 110 is partially reflector coated. The larger mass of the passive optical windows, visa the thin film optical coating of the prior art, enables better heat transfer and dissipation thereby enabling a higher average power optical damage threshold for these laser surfaces. In addition, the diffraction of the laser beam emitted by the semiconductor laser reduces the optical flux on external surfaces of 108 and 110, which also reduces damages at these external surfaces. In accordance with the present invention, the aforementioned surface heating problem is transferred from the surface of the semiconductor laser 106 to the surfaces of the windows 108 and 110. Heat deposited at the surface of the semiconductor laser flows into the window material, thereby reducing optical damage to the semiconductor laser reflectors, normally in contact with the atmosphere.

Figure 7:
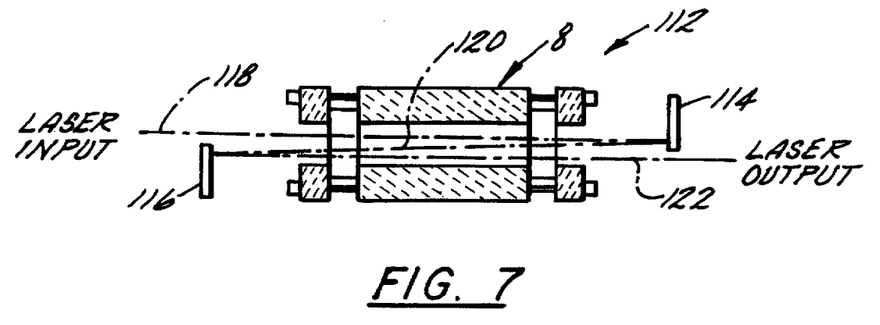
FIG. 7 is a diagrammatic side cross sectional view of a multipass optical device in accordance with the present invention.

Referring to FIG. 7, an optical multipass configuration for use external to a laser is shown generally at 112. Optical multipass configuration 112 comprises an optical assembly 8 positioned between a pair of mirrors 114 and 116, which define the multipass configuration. More specifically, the laser beam 118 passes through optical assembly 8 as described hereinbefore, i.e., the first pass. The laser beam 118 exiting optical assembly 8 on this first pass is reflected, by mirror 114, back through (in the opposite direction) optical assembly 8, i.e., the second pass. The laser beam 120 exiting optical assembly 8 on this second pass is reflected, by mirror 116, back through (in the same direction as the first pass) optical assembly 8, i.e. the third pass. The laser beam 122 exiting optical assembly 8 on this third pass is the output laser beam. The mirrors 114 and 116 are positioned to optimize phase matching during each pass, thereby providing for efficient optical (second) harmonic generation. Similar to the embodiment described with respect to FIG. 4, the positioning of mirrors 114 and 116 reverses the beam walk-off direction on each pass which prevents the second harmonic beam from walking away from the pump beam. Accordingly, longer second harmonic conversion lengths can be utilized, than were previously practical with prior art technology, whereby optimum conversion from the fundamental laser beam to the frequency converted beam can be obtained. While three passes have been described for the multipass configuration it will be appreciated that any plural number of passes may be employed. Due to the high efficiency of the multipass configuration, it may be the preferred embodiment of the present invention. This embodiment, FIG. 7, may also be inserted into a laser feedback cavity, as in FIG. 2, or into a ring optical resonator as shown in FIG. 3.

Figure 8:
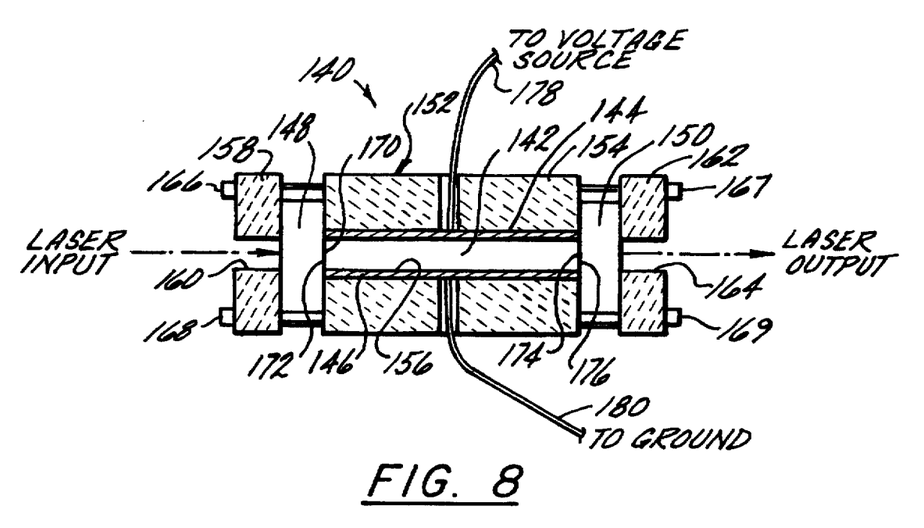
FIG. 8 is a diagrammatic side cross sectional view of an electro-optic modulator device in accordance with the present invention.

Referring to FIG. 8, an optical assembly 140 comprising a non-linear CdTe crystal 142 having conductive electrodes 144 and 146 applied at opposing sides thereof, which define an electro-optic modulator. Crystal 142 is disposed between two ZnSe windows 148 and 150 whose outer laser entrance and exiting surfaces are anti-reflection coated. A dielectric crystal mount housing 152 comprises support member 154 having an opening 156 therethrough with crystal 142, having electrodes 144 and 146 applied thereto, disposed therein, an end support member 158 having an opening 160 therethrough for supporting window 148, and an end support member 162 having an opening 164 therethrough for supporting window 142. End members 158 and 162 are secured to member 154 by fasteners 166–169. Mount housing 152 supports the windows 148, 158 and the non-linear crystal 142 with the optically flat surfaces thereof in uniform contact with each other (i.e., surface 170 of window 148 is in contact with surface 172 of crystal 142 and surface 174 of window 158 is in contact with surface 176 of crystal 142). The optical axis of the crystal is positioned with respect to the laser beam for amplitude or phase modulation. Conductive wires 178 and 180 are electrically connected to electrodes 144 and 146, respectively, for applying a voltage potential resulting in an electronic field across the crystal. Wires 178 and 180 extend through openings 182 and 184, respectively, in support member 154. For most applications, anti-reflection coatings on one of these interfacing surfaces are not needed, since CdTe and ZnSe have refraction indexes which are close (i.e., n=2.7 and 2.4, respectively) at $CO_2$ laser wavelengths. The surfaces of windows 148 and 158 not in contact with crystal 142 are anti-reflection coated to minimize through-put losses, as is well known. In accordance with the present invention, the aforementioned anti-reflection coating's poor sticking problem, associated with CdTe, is eliminated because the anti-reflection coatings are transferred from the surface of the crystal 142 to the surfaces of the windows 148 and 158, thereby providing longer operating life for the electro-optical modulator.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An active optical assembly receptive to a laser beam, the laser beam interacting with said active optical assembly to process the laser beam, said active optical assembly comprising:

an active optical crystal having an optical entrance surface and an opposing optical exit surface;

a first optical window having an optical entrance surface and an opposing optical exit surface, said exit surface of said first optical window being in physical contact with said entrance surface of said active optical crystal thereby defining a first optical interface, whereby heat deposited at said entrance surface of said active optical crystal, as a result of the laser beam passing therethrough, is transferred to said exit surface of said first window in physical contact therewith;

a second optical window having an optical entrance surface and an opposing optical exit surface, said entrance surface of said second optical window being in physical contact with said exit surface of said active optical crystal thereby defining a second optical interface, whereby heat deposited at said exit surface of said active optical crystal, as a result of the laser beam passing therethrough, is transferred to said entrance surface of said second window in physical contact therewith; and said first and second windows are comprised of a material having an index of refraction similar to an index of refraction of said active optical crystal, whereby Fresnel reflection at each of said first and second optical interfaces resulting from the laser beam passing therethrough is low.

2. The active optical assembly of claim 1 wherein said active optical crystal comprises a non-linear optical crystal.

3. The active optical assembly of claim 1 wherein said active optical crystal includes an optical axis positioned with respect to the laser beam for satisfying phase matching in a non-linear process.

4. The active optical assembly of claim 3 wherein said non-linear process comprises optical harmonic generation, optical parametric amplification, optical parametric oscillation or non-linear optical scattering for generation of other optical wavelengths utilizing Raman or Brillouin scattering.

5. The active optical assembly of claim 1 further comprising:

a housing for supporting said first and second windows in physical contact with said active optical crystal.

6. The active optical assembly of claim 1 wherein said entrance surface of said first optical window and said exit surface of said second optical window include an anti-reflection coating.

7. The active optical assembly of claim 1 wherein said first and second windows are comprised of a material having a higher thermal conductivity and a higher optical surface damage threshold than that of said active optical crystal, whereby heat deposited at said entrance surface of said active optical crystal, as a result of the laser beam passing therethrough, is transferred to said exit surface of said first window in physical contact therewith, and heat deposited at said exit surface of said active optical crystal, as a result or the laser beam passing therethrough, is transferred to said entrance surface of said second window in physical contact therewith.

8. The active optical assembly of claim 1 wherein:

said active optical crystal comprises $AgGaSe_2$;

said first and second windows are comprised of GaAs.

9. The active optical assembly of claim 1 wherein:

said active optical crystal comprises $AgGaSe_2$;

said first and second windows are comprised of ZnSe.

10. The active optical assembly of claim 1 wherein said entrance surface of said first window and said exit surface of said second window are convex.

11. A laser system comprising a laser source and corresponding laser mirrors, wherein the improvement comprises:

an active optical module disposed within said laser system for non-linearly processing radiation from said laser source, said active optical module comprising;

an active optical crystal having a first optical surface and a second opposing optical surface, a first optical window having a first optical surface and a second opposing optical surface, said second surface of said first optical window being in physical contact with said first surface of said active optical crystal thereby defining a first optical interface, whereby heat deposited at said first surface of said active optical crystal, as a result of the laser beam passing therethrough, is transferred to said second surface of said first window in physical contact therewith, a second optical window having a first optical surface and a second opposing optical surface, said first surface of said second optical window being in physical contact with said second surface of said active optical crystal thereby defining a second optical interface, whereby heat deposited at said second surface of said active optical crystal, as a result of the laser beam passing therethrough, is transferred to said first surface of said second window in physical contact therewith; and said first and second windows are comprised of a material having an index of refraction similar to an index of refraction of said active optical crystal, whereby Fresnel reflection at each of said first and second optical interfaces resulting from the radiation passing therethrough is low.

12. The laser system of claim 11 wherein said active optical crystal comprises a non-linear optical crystal.

13. The laser system of claim 11 wherein said active optical crystal includes an optical axis positioned with respect to said radiation for satisfying phase matching in a non-linear process assembly.

14. The laser system of claim 13 wherein said non-linear process comprises optical parametric amplification, optical parametric oscillation or non-linear optical scattering for generation of other optical wavelengths utilizing Raman or Brillouin scattering, acousto-optics or electro-optics elements for modulating, Q-switching, frequency translating, or scanning of laser beams.

15. The laser system of claim 11 wherein said first surface of said first optical window and said second surface of said second optical window include an anti-reflection coating.

16. The laser system of claim 11 wherein said first and second windows are comprised of a material having a higher thermal conductivity and a higher optical surface damage threshold than that of said active optical crystal, whereby heat deposited at said first surface of said active optical crystal, as a result of the radiation passing therethrough, is transferred to said second surface of said first window in physical contact therewith, and heat deposited at said second surface of said active optical crystal, as a result of the radiation passing therethrough, is transferred to said first surface of said second window in physical contact therewith.

17. The laser system of claim 11 wherein:
said active optical crystal comprises AgGaSe$_2$;
said first and second windows are comprised of GaAs.

18. The laser system of claim 11 wherein:
said active optical crystal comprises AgGaSe$_2$;
said first and second windows are comprised of ZnSe.

19. A resonant ring optical cavity comprising a plurality of laser mirrors defining a path for a laser beam, wherein the laser beam path is a ring resulting in a build up of optical flux, wherein the improvement comprises:

an active optical module disposed in said laser beam path within said resonant ring optical cavity for non-linearly processing said laser beam, said active optical module comprising;

an active optical crystal having a first optical surface and a second opposing optical surface, a first optical window having a first optical surface and a second opposing optical surface, said second surface of said first optical window being in physical contact with said first surface of said active optical crystal thereby defining a first optical interface, whereby heat deposited at said first surface of said active optical crystal, as a result of the laser beam passing therethrough is transferred to said second surface of said first window in physical contact therewith, a second optical window having a first optical surface and a second opposing optical surface, said first surface of said second optical window being in physical contact with said second surface of said active optical crystal thereby defining a second optical interface, whereby heat deposited at said second surface of said active optical crystal, as a result of the laser beam passing therethrough, is transferred to said first surface of said second window in physical contact therewith, and said first and second windows are comprised to a material having an index of refraction similar to an index of refraction of said active optical crystal, whereby Fresnel reflection at each of said first and second optical interfaces resulting from the laser beam passing therethrough is low.

20. The resonant ring optical cavity of claim 19 wherein said active optical crystal comprises a non-linear optical crystal.

21. The resonant ring optical cavity of claim 19 wherein said active optical crystal includes an optical axis positioned with respect to said radiation for satisfying phase matching in a non-linear process.

22. The resonant ring optical cavity of claim 21 wherein said non-linear process comprises optical parametric amplification, optical parametric oscillation or non-linear optical scattering for generation of other optical wavelengths utilizing Raman or Brillouin scattering.

23. The resonant ring optical cavity of claim 19 wherein said first surface of said first optical window and said second surface of said second optical window include an anti-reflection coating.

24. The resonant ring optical cavity of claim 19 wherein said first and second windows are comprised of a material having a higher thermal conductivity and a higher optical surface damage threshold than that of said active optical crystal, whereby heat deposited at said first surface of said active optical crystal, as a result of the laser beam passing therethrough, is transferred to said second surface of said first window in physical contact therewith, and heat deposited at said second surface of said active optical crystal, as a result of the laser beam passing therethrough, is transferred to said first surface of said second window in physical contact therewith.

25. The resonant ring optical cavity of claim 19 wherein:
said active optical crystal comprises AgGaSe$_2$;
said first and second windows are comprised of GaAs.

26. The resonant ring optical cavity of claim 19 wherein:
said active optical crystal comprises AgGaSe$_2$;
said first and second windows are comprised of ZnSe.

27. An active optical assembly receptive to a laser beam, the laser beam interacting with said active optical assembly to process the laser beam, said active optical assembly comprising:

a first optical window having an optical entrance surface and an opposing optical exit surface;

a first active optical crystal having an optical entrance surface and an opposing optical exit surface, said exit surface of said first optical window being in physical contact with said entrance surface of said first active optical crystal thereby defining a first optical interface, whereby heat deposited at said entrance surface of said first active optical crystal, as a result of the laser beam passing therethrough, is transferred to said exit surface of said first window in physical contact therewith, said first active optical crystal having a first optical axis positioned relative to a laser beam axis through said active optical assembly for phase matching thereof;

a second optical window having an optical entrance surface and an opposing optical exit surface, said entrance surface of said second optical window being in physical contact with said exit surface of said first active optical crystal thereby defining a second optical interface, whereby heat deposited at said exit surface of said first active optical crystal, as a result of the laser beam passing therethrough, is transferred to said entrance surface of said second window in physical contact therewith;

a second active optical crystal having an optical entrance surface and an opposing optical exit surface, said exit surface of said second optical window being in physical contact with said entrance surface of said second active optical crystal thereby defining a third optical interface, whereby heat deposited at said entrance surface of said second active optical crystal, as a result of the laser beam passing therethrough is transferred to said exit surface of said second window in physical contact therewith, said second active optical crystal having a second optical axis, said second optical axis being rotated relative to said first optical axis about the laser beam axis through said active optical assembly for phase matching thereof;

a third optical window having an optical entrance surface and an opposing optical coated exit surface, said entrance surface of said third optical window being in physical contact with said exit surface of said second active optical crystal thereby defining a fourth optical interface, whereby heat deposited at said exit surface of said second active optical crystal, as a result of the laser beam passing therethrough, is transferred to said entrance surface of said third window in physical contact therewith;

a third active optical crystal having an optical entrance surface and an opposing optical coated exit surface, said exit surface of said third optical window being in physical contact with said entrance surface of said third active optical crystal thereby defining a fifth optical interface, said third active optical crystal having a third optical axis, whereby heat deposited at said entrance surface of said third active optical crystal, as a result of the laser beam passing therethrough, is transferred to said exit surface of said third window in physical contact therewith, said third optical axis being rotated relative to said second optical axis about the laser beam axis through said active optical assembly for phase matching thereof;

a fourth optical window having an optical nonantireflection coated entrance surface and an opposing optical exit surface, said entrance surface of said fourth optical window being in physical contact with said exit surface of said third non-linear crystal thereby defining a sixth optical interface, whereby heat deposited at said exit surface of said third active optical crystal, as a result of the laser beam passing therethrough, is transferred to said entrance surface of said fourth window in physical contact therewith; and said first, second, third and fourth windows are comprised of a material having an index of refraction similar to an index of refraction of said first, second and third active optical crystals, whereby Fresnel reflection at each of said first, second, third, fourth, fifth and sixth optical interfaces resulting from the laser beam passing therethrough is low.

28. The active optical assembly of claim 27 wherein said first, second and third active optical crystal each comprise a non-linear optical crystal.

29. The active optical assembly of claim 27 wherein said second optical axis is rotated relative said first optical axis by about 180° and said third optical axis is rotated relative to said second optical axis by about 180°.

30. The active optical assembly of claim 27 further comprising:

a housing for supporting said first and second windows in physical contact with said first active optical crystal, said second and third windows in physical contact with said second active optical crystal, and said third and fourth windows in physical contact with said third active optical crystal.

31. The active optical assembly of claim 27 wherein said entrance surface of said first optical window and said exit surface of said fourth optical window include an antireflection coating.

32. The active optical assembly of claim 27 wherein said first, second, third and fourth windows are comprised of a material having a higher thermal conductivity and a higher optical surface damage threshold than that of said first, second and third active optical crystals, whereby heat deposited at said entrance surface of said first active optical crystal, as a result of the laser beam passing therethrough, is transferred to said exit surface of said first window in physical contact therewith, heat deposited at said exit surface of said first active optical crystal, as a result of the laser beam passing therethrough, is transferred to said entrance surface of said second window in physical contact therewith, heat deposited at said entrance surface of said second active optical crystal, as a result of the laser beam passing therethrough, is transferred to said exit surface of said second window in physical contact therewith, heat deposited at said exit surface of said second active optical crystal, as a result of the laser beam passing therethrough, is transferred to said entrance surface of said third window in physical contact therewith, heat deposited at said entrance surface of said third active optical crystal, as a result of the laser beam passing therethrough, is transferred to said exit surface of said third window in physical contact therewith, and heat deposited at said exit surface of said third active optical crystal, as a result of the laser beam passing therethrough, is transferred to said entrance surface of said fourth window in physical contact therewith.

33. The active optical assembly of claim 27 wherein:

said first, second and third non-linear crystals are comprised of $AgGaSe_2$;

said first, second, third and fourth windows are comprised of GaAs.

34. The active optical assembly of claim 27 wherein:

said first, second and third non-linear crystals are comprised of $AgGaSe_2$;

said first, second, third and fourth windows are comprised of ZnSe.

35. A laser device, comprising:

a solid state laser;

a first optical window having a first reflective surface and an opposing second surface, said second surface of said first optical window being in physical contact with a surface of said solid state laser thereby defining a first optical interface, whereby heat deposited at said surface of said solid state laser is transferred to said second surface of said first window in physical contact therewith;

a second optical window having a first surface and an opposing second surface, said first surface of said second optical window being in physical contact with an output surface of said solid state laser thereby defining a second optical interface, whereby heat deposited at said output surface of said solid state laser is transferred to said first surface of said second window in physical contact therewith; and said first and second windows are comprised of a material having an index of refraction similar to an index of refraction of said solid state laser, whereby Fresnel reflection at each of said first and second optical interfaces resulting from a laser beam passing therethrough is low.

36. The laser device of claim 35 wherein said first and second windows are comprised of a material having a higher thermal conductivity and a higher optical surface damage threshold than that of said solid state laser, whereby heat deposited at surfaces of said solid state laser is transferred to said surfaces of said first and second windows.

37. The laser device of claim 35 wherein said first and second windows are comprised of GaAlAs.

38. The laser device of claim 35 wherein said first and second windows are comprised of GaAs.

39. The laser device of claim 35 wherein said reflective surface of said first window and said output of said second window are convex.

40. The laser device of claim 35 wherein said solid state laser comprises semiconductor laser.

41. A multipass optical system for use in processing a laser beam, comprising:

an active optical module comprising,
(1) an active optical crystal having a first optical surface and a second opposing optical surface,
(2) a first optical window having a first optical surface and a second opposing optical surface, said second surface of said first optical window being in physical contact with said first surface of said active optical crystal thereby defining a first optical interface, whereby heat deposited at said first surface of said active optical crystal, as a result of the laser beam passing therethrough, is transferred to said second surface of said first window in physical contact therewith, and
(3) a second optical window having a first optical surface and a second opposing optical surface, said first surface of said second optical window being in physical contact with said second surface of said active optical crystal thereby defining a second optical interface, whereby heat deposited at said second surface of said active optical crystal, as a result of the laser beam passing therethrough, is transferred to said first surface of said second window in physical contact therewith;

a plurality of mirrors positioned at said active optical module, said mirrors providing for multiple passes of said laser beam through said active optical module for phase matching of said laser beam; and said first and second windows are comprised of a material having an index of refraction similar to an index of refraction of said active optical crystal, whereby Fresnel reflection, at each of said first and second optical interfaces resulting from the laser beam passing therethrough is low.

42. The multipass optical system of claim 41 wherein said plurality of mirrors comprises:

a first mirror positioned at said second optical surface of said second window for receiving said laser beam which passed through said active optical module and reflecting said laser beam back through said active optical module for phase matching thereof; and a second mirror positioned at said first optical surface of said first window for receiving said laser beam reflected back through said active optical module and again reflecting said laser beam through said active module for phase matching thereof, thereby providing a laser output beam.

43. The multipass optical system of claim 41 wherein said active optical crystal comprises a non-linear optical crystal.

44. The multipass optical system of claim 41 wherein said active optical crystal includes an optical axis positioned with respect to said laser beam for satisfying phase matching in a non-linear process.

45. The multipass optical system of claim 44 wherein said non-linear process comprises optical parametric amplification, optical parametric oscillation or non-linear optical scattering for generation of other optical wavelengths utilizing Raman or Brillouin scattering.

46. The multipass optical system of claim 41 wherein said first surface of said first optical window and said second surface of said second optical window include an anti-reflection coating.

47. The multipass optical system of claim 41 wherein said first and second windows are comprised of a material having a higher thermal conductivity and a higher optical surface damage threshold than that of said active optical crystal, whereby heat deposited at said first surface of said active optical crystal, as a result of the radiation passing therethrough, is transferred to said second surface of said first window in physical contact therewith, and heat deposited at said second surface of said active optical crystal, as a result of the radiation passing therethrough, is transferred to said first surface of said second window in physical contact therewith.

48. The multipass optical system of claim 41 wherein:

said active optical crystal comprises $AgGaSe_2$;

said first and second windows are comprised of GaAs.

49. The multipass optical system of claim 41 wherein:

said active optical crystal comprises $AgGaSe_2$;

said first and second windows are comprised of ZnSe.

50. An active optical module for use in modulating a laser beam, comprising:

an active electro-optic crystal having an optical entrance surface and an opposing optical exit surface;

a first optical window having an optical entrance surface and an opposing optical exit surface, said exit surface of said first optical window being adjacent said entrance surface of said active electro-optic crystal thereby defining a first optical interface; and a second optical window having an optical entrance surface and an opposing optical exit surface, said entrance of said second optical window being adjacent said exit surface of said active electro-optic crystal thereby defining a second optical interface.

51. The active optical module of claim 50 wherein said active electro-optic crystal includes an optical axis positioned with respect to the laser beam for phase modulation.

52. The active optical module of claim 50 wherein said active electro-optic crystal includes an optical axis positioned with respect to the laser beam for amplitude modulation.

53. The active optical module of claim 50 further comprising:

a housing for supporting said first and second windows adjacent said active electro-optic crystal.

54. The active optical module of claim 50 wherein said first and second windows are comprised of a material having an index of refraction similar to an index of refraction of said active electro-optic crystal, whereby Fresnel reflection at each of said first and second optical interfaces resulting from the laser beam passing therethrough is low.

55. The active optical module of claim 50 wherein said entrance surface of said first optical window and said exit surface of said second optical window include an anti-reflection coating.

56. The active optical module of claim 50 wherein:

said exit surface of said first optical window or said entrance surface of said active electro-optic crystal has an anti-reflection coating thereon; and said entrance surface of said second optical window or said exit surface of said active electro-optic crystal has an anti-reflection coating thereon;

whereby Fresnel reflection at each of said first and second optical interfaces resulting from the laser beam passing therethrough is improved.

57. The active optical module of claim 50 wherein:

said active electro-optic crystal comprises CdTe;

said first and second windows are comprised of ZnSe.

58. The active optical module of claim 50 wherein said entrance surface of said first window and said exit surface of said second window are convex.

59. The active optical module of claim 50 wherein said electro-optic crystal further includes:

electrodes disposed on opposing sides of said electro-optic crystal.

* * * * *

UNITED STATES PATENT AND TRADEMARK OFFICE
CERTIFICATE OF CORRECTION

PATENT NO. : 5,680,412
DATED : October 21, 1997
INVENTOR(S) : DeMaria, et. al.

It is certified that error appears in the above-identified patent and that said Letters Patent is hereby corrected as shown below:

Title page, item [75], inventor: add -- Robert T. Brown, Manachester, Conn.

Signed and Sealed this

Seventh Day of April, 1998

Attest:

BRUCE LEHMAN

*Attesting Officer*  *Commissioner of Patents and Trademarks*